United States Patent [19]

Oishi et al.

[11] Patent Number: 4,733,316
[45] Date of Patent: Mar. 22, 1988

[54] MAGNETIC TAPE CASSETTE WITH SLIDE GUARD RAMP ACTUATED CANTILEVER LOCKING LEVER

[75] Inventors: Kengo Oishi; Shingo Katagiri, both of Kanagawa, Japan

[73] Assignee: Fuji Photo Film Co., Ltd., Kanagawa, Japan

[21] Appl. No.: 890,046

[22] Filed: Jul. 28, 1986

[30] Foreign Application Priority Data

Aug. 9, 1985 [JP] Japan ............................ 60-121657[U]

[51] Int. Cl.$^4$ ............................................ G11B 15/32
[52] U.S. Cl. ..................................... 360/132; 242/198
[58] Field of Search ........ 360/132; 242/198, 199–200, 242/197

[56] References Cited

U.S. PATENT DOCUMENTS 4,660,784  4/1987  Sumida et al. .................. 360/132 X Primary Examiner—John H. Wolff
Attorney, Agent, or Firm—Sughrue, Mion, Zinn, Macpeak, and Seas

[57] ABSTRACT

A U-shaped slide guard is slidably mounted on the bottom of a lower half case of a magnetic tape cassette. The slide guard has a flat bottom wall which lies flush with the bottom wall of the lower half case. A cantilever type locking member integral with the lower half case bottom wall has an end part projecting downwardly from the bottom of the lower half case. The slide guard has aligned locking holes for selectively receiving the end part of the locking member so that the position of the slide guard is maintained by engagement of the end part of the locking member with a given one of the locking holes. A tapered ramp formed on the rear edge of the slide guard is aligned with the locking holes and the ramp extends rearwardly and downwardly. When the slide guard is attached to the lower half case, the end part of the locking member slides on the tapered ramp for cammed projection into the bottom of the lower half case so as to easily ride on the upper surface of the bottom wall of the slide guard until reaching a given one of the locking holes.

1 Claim, 2 Drawing Figures

MAGNETIC TAPE CASSETTE WITH SLIDE GUARD RAMP ACTUATED CANTILEVER LOCKING LEVER

FIELD OF THE INVENTION

This invention relates to a magnetic tape cassettes, and more specifically to a novel compact magnetic tape cassette for audio equipment and wherein sliding movement of a slide guard mounted to a cassette lower half case automatically cams a cantilever locking lever into unlocking position to permit continued sliding of the slide guard.

BACKGROUND OF THE INVENTION

Recently, cassette tape recorders have been reduced both in size and in weight, and accordingly reduced size magnetic tape cassettes are required. In the field of audio technique, there has been a strong demand for the provision of magnetic tape cassettes which can record and reproduce signals with high quality and high density over a long period of time. In order to meet these requirements, a magnetic tape cassette has been proposed which operates in accordance to a digital system such, as a pulse code modulation (PCM) system, in which the pulse conversion of input signals is carried out for recording and reproducing operations, has been proposed. One example of a magnetic tape cassette operated according to such PCM system is a large video tape cassette which has a recording frequency band which is wider than an audio compact cassette. It's recording frequency band should be about five times as wide as that of a conventional audio magnetic tape cassette.

The video tape cassette is generally for a rotary head system, and has a guard panel which is adapted to close an opening formed in the front wall of the cassette and which guard panel can be swung up and down. That is, a magnetic tape cassette operated according to the digital system is purposely for signal recording and reproducing operation of short recording wavelength, high density, and wide frequency band. Therefore, the structure of the cassette should be designed so that the cassette adequately prevents dust from entering the cassette interior and wherein the tape is also adequately protected from damage, in comparison with that of conventional audio compact cassette. Since it is estimated that the frequency of use of the magnetic tape cassette outdoors, increases day by day, similar to the case of a conventional audio compact cassette, it is essential that the cassette constitute an excellent dust proof structure.

In view of the foregoing requirements, a magnetic tape cassette has been proposed which is so designed that when it is not in use, the opening formed in the front wall of the cassette and the reel shaft inserting holes are closed or sealed to prevent the entrance of dust into the cassette interior. The cassette is provided with a slide guard which is slidable on the bottom of the lower half case of the cassette. The slide guard is urged by a spring or like biasing member, such that when the cassette is in use, the lower part of the opening at the end of the cassette case is opened and the reel shaft inserting holes are exposed. To the contrary, when the cassette is not in use, the lower part of the opening within the front of the cassette case and the reel shaft inserting holes are closed. The lower half case has a cantilever type locking member having a free end part which normally protrudes below the bottom of the lower half case. The end part of the locking member is adapted to engage selectively, two locking holes formed in the slide guard. The end part of the locking member engage may one of the two locking holes so that the slide guard is fixedly positioned in place, after being slid into position beneath the lower half case. The magnetic tape recording and reproducing device is provided with a disengaging member which is adapted to push the end part of the locking member against the bottom of the bucket which is the cassette loading section, thereby disengaging the end part from the slide guard locking hole. That is, when the cassette is loaded, the means for maintaining the opening within the end of the cassette case closed is released by the disengaging member; and when the case is unloaded, the means for maintaining the opening open is released by the disengaging member.

In assembling the cassette, the slide guard is attached to the lower half case in such a manner that it is slidable along the lower half case. However, since the end part of the locking member protrudes below the bottom of the lower half case as described above, the end part of the locking member abuts against the leading edge of the slide guard as the latter is moved backwardly of the cassette lower half case, thus obstructing the attaching of the slide guard to the lower half case or the sliding movement along the case. Accordingly, the attaching of the slide guard to the lower half case is considerably intricate and the action rendered complicated, because it is necessary to disengage the end part of the locking member from the edge of the slide guard in order to permit the slide guard to move from the front to the rear of the lower half case. In order to eliminate this difficulty, a system may be employed in which, when the slide guard is attached to the lower half case, the locking member is mechanically bent so that the end part thereof is caused to move inwardly of the lower half case. However, such an arrangement causes other difficulties such as the locking member being broken when bent excessively, and the elasticity decreasing by creep so that the locking effect decreases over time.

SUMMARY OF THE INVENTION

The present invention is directed to a magnetic tape cassette including joined, upper and lower half cases forming a chamber therebetween, a pair of hubs on which the magnetic tape is wound within said chamber; a hub lock member for said cassette, internally of said chamber and including means contacting said hubs for locking said hubs against rotation. Said upper and lower half cases define an opening at one end through which the magnetic tape can be pulled forwardly of the cassette. A rotatable guard panel is mounted to one of said upper and lower half cases and adapted to open and close said opening. A slide guard is slidably mounted on the bottom of the lower half case. A cantilever type locking member lies within the lower half case and said locking member having an end part which protrudes slightly downwardly, below the bottom of the lower half case. Said slide guard has a pair of aligned, space locking holes sized and positioned to receive the end part of the locking member during sliding of the locking member on the bottom of the lower half case so that the position of the slide guard is controlled by engagement of the end part of the locking member with the locking holes. The improvement resides in a tapered ramp formed within the rear edges of the slide guard on the prolongation of the line extending through the aligned locking holes in such a manner that the ramp inclines downwardly and rearwardly whereby when the slide guard is attached to the lower half case, the downwardly projecting end part of the locking member is cammed by the tapered ramp so as to ride up into and flush with the bottom of the lower half case until the end part reaches the locking hole of the slide guard proximate to the tapered ramp whereupon it enters the locking hole to lock the slide guard against further movement along the lower half case.

As the tapered ramp is formed on the rear edge of the slide guard in such a manner that it meets the end part of the locking member as the slide guard is slid along the lower half case, the end part of the locking member is caused to smoothly ride into the bottom of the lower half case guided by the tapered ramp such that the slide guard may be readily attached to the lower half case.

DESCRIPTION OF THE PREFERRED EMBODIMENT

Figure 1:
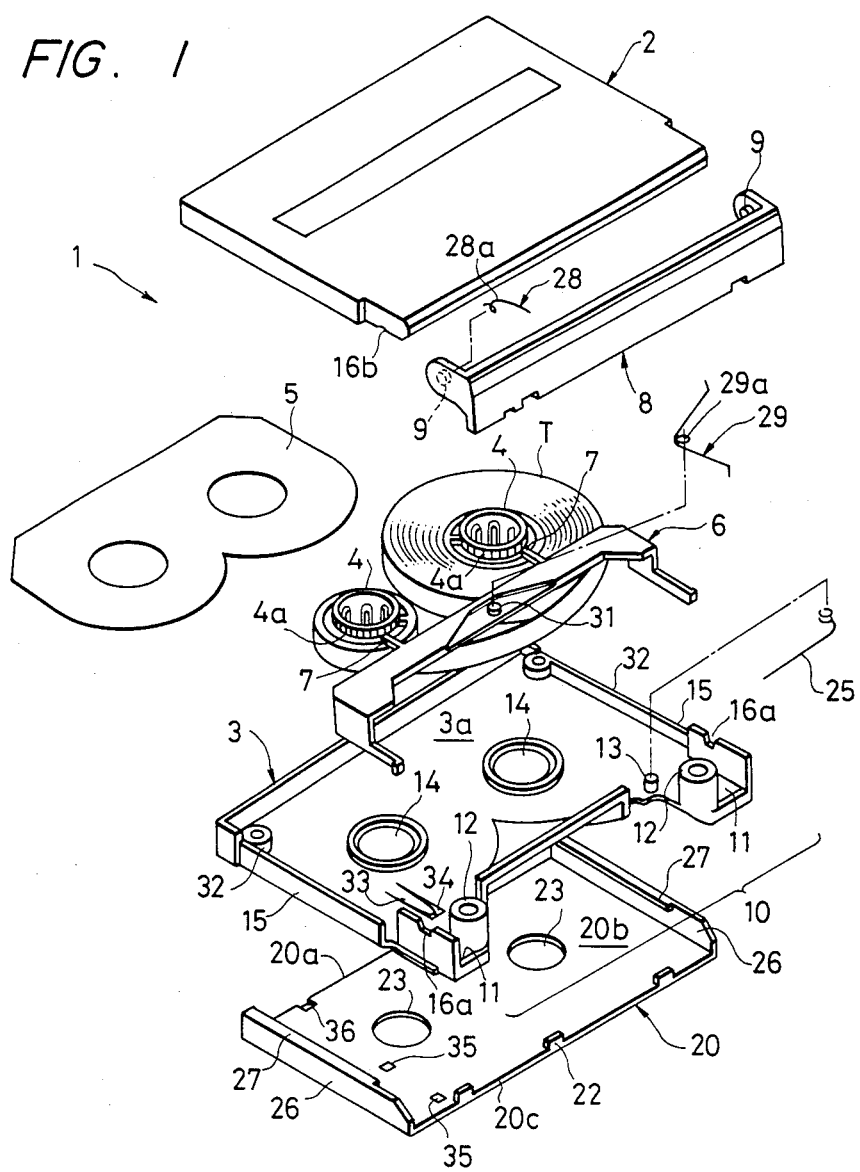
FIG. 1 is an exploded, perspective view of a compact, magnetic tape cassette forming a preferred embodiment of the present invention.

Referring to the drawing, one embodiment of the compact magnetic tape cassette will be described with reference to the accompanying drawing in detail.

A magnetic tape cassette 1, is illustrated in FIG. 1 which is equal in size to or smaller than a conventional compact audio tape cassette. The magnetic tape cassette 1 includes a cassette tape T and is made up of upper and lower half cases 2 and 3 which are appropriately joined together. The cassette tape incorporates a pair of flangeless hubs 4 on which magnectic tape T is wound. A pair of friction sheets 5 are provided for allowing the smooth rotation of the hubs 4. A hub locking member 6 is incorporated internally of chamber formed by the joined upper and lower half cases 2, 3 which hub locking member 6 prevents the unwanted rotation of hubs 4. The cassette tape is provided with a guard panel 8 for partially closing off an opening 10 formed in the front wall of the tape cassette, and a slide guard 20 is provided for closing off the lower part of opening 10.

The hubs 4 have annular collars 4a which protrude upwardly so that a pair of protrusions 7 engage with the annular collars 4a.

Similarly to the lower half case of a conventional video tape cassette, the lower half case 3 of the cassette 1, as illustrated in FIG. 1, is provided with a pair of reel shaft inserting holes 14 and a pair of tape drawing outlets 11 on both sides of the frontal opening 10, so that the magnetic tape T can be pulled forwardly of the cassette. A cantilever type slide guard locking member 33 is integrally molded into the bottom of the lower half case 3 in such a manner that it has a downwardly directed right angle end 34 which protrudes downwardly from the bottom wall 3a of the lower half case 3. The cassette bottom wall 3a, between the cassette type drawing outlets 11 is set back from the front end of that cassette half. Therefore, when the magnetic tape cassette 1 is loaded in the magnetic tape recording and reproducing device, the tape drawing member of the device can go inside the cassette from below.

Slide guard 20 is substantially in the form of a flat plate having right angle side pieces 26 to both sides with the side pieces 26 being of inverted L-shaped. The side pieces 26 extend along the side wall 15 of the lower half case 3 and terminate at their upper ends in horizontal overhangs 27 which extend across and overhang the upper edges 32 of the side walls 15 of the lower half case 3. The overhangs 27 are so formed that they confront each other and extend slightly inside the cassette tape. Through holes 23 corresponding to the reel shaft inserting holes 14 are formed in the flat bottom wall 20b of the slide guard 20, which bottom wall 20b confronts the bottom wall 3a of the lower half case 3. A slide guard spring 25 engages with the slide guide 20 to urge the slide guide 20 forwardly so as to move from front to rear on the lower case half 3. Locking holes 35 are formed in the slide guard 20 at the position for the reel shaft inserting holes 14 of the lower half case 3 coincides with the through holes 23, i.e. the access opening to the interior of the tape cassette, and at the position where the inserting holes 14 are closed. The locking holes are engaged by the end 34 of the locking member 33.

An important aspect in the present invention is the formation of a tapered ramp 36 within the rear edge 20a of the bottom wall 20b of the slide guard. The ramp 36 inclines downwardly and rearwardly from the front of the cassette as defined by opening 10. Similarly, to the upper half case of a convention video tape cassette, the front part of the upper half case 2 is so designed that, when the upper half case 2 is combined with the lower half case 3 a pair of aforementioned tape drawing outlets 11 are formed to opposite sides of the cassette. Means (not shown) for regulating the rotation position of the hubs 4 are provided in the upper half case 2.

Figure 2:
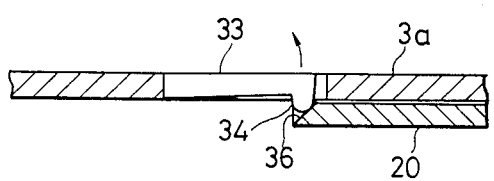
FIG. 2 is a vertical sectional view of a portion of the bottom of the lower cassette half case and the rear edge of the slide guard slidably mounted thereon, and showing the cantilever locking lever of the cassette lower half case in contact with the beveled ramp at the rear edge of the slide guard in the act of camming the end part of the cantilever locking level upwardly into the bottom of the lower half case to facilitate continued sliding of the slide guard.

In assembling the magnetic tape cassette 1, first the slide guard 20 is coupled to the lower half case 3 in such a manner that the former 20 is set below the latter 3. In this respect, the upper edges 32 of the side walls 15 of the lower half case 3 engaged with the lower surfaces of the lateral overhangs 27 of the slide guard 20. Under this condition, the slide guard 20 may be slid on the lower half case in the front to rear direction, FIG. 1. As a result thereof, the end 34 of the locking member 33 abuts the tapered ramp 36 formed at the rear edge 20a of the slide guard. As the slide guard further slides rearwardly, the end part 34 of the locking member 33 is cammed upwardly on the tapered ramp 36 so as to project into the lower bottom wall 3a of the lower half case (see FIG. 2). In other words, the end part 34 of the locking member 3 is cammed upwardly into the bottom wall 3a of the lower half case 3 as the slide guard 20 is moved, as a result of which, the bottom 3a of the lower half case 3 is free of obstructions, and therefore the slide guard 20 can be smoothly attached to the lower half case 3.

One end of a slide guard spring 25 is connected to an upwardly projecting and engaging pin 13 formed or mounted on lower half case bottom wall 3a. The other end of the slide guard spring 25 engages the vertically raised protrusions 22 at the front edge 20c of the slide guard 20. Thus the slide guard 20 is mounted for sliding back and forth and urged forwardly, out of the plane of the paper, FIG. 1, and forwardly of the cassette 1.

Thereafter, the hubs 4 in which the magnetic tape T has been wound are placed on top of the friction sheet 5 which is mounted on the inner surface of the lower half case 3 in such a manner that the hubs 4 are positioned over the reel shaft inserting holes 4 respectively. The magnetic tape T is laid over the upwardly projecting right and left tape guides 12 by pulling the tape T outside to the drawing outlets 11. A second friction sheet (not shown) is laid on top of the hubs 4 once the hubs 4 are in place. Locking member 6 is placed on the friction sheet 5 and urged in the predetermined direction by a spring 29 having a central coil or loop portion 29a which is fitted on upwardly projecting pin 31, and having opposite ends contacting the locking member 6 and cassette lower half case 3, respectively.

When the upper half case 2 is mounted onto the lower half case 3, the guard panel 8 is coupled to the upper half case 2 in a manner such that oppositely directed pivot pins 9, projecting inwardly from opposite side walls 8a of the U-shaped guard panel 9, are rotatably received within holes or journals defined by cut outs 16a within opposing side walls 15 of the cassette lower half case, and aligned cut outs 16b within opposed side walls of the cassette upper half case 2. A guard panel spring 28 includes a loop or coil center portion 28a which is mounted to one of the pins 9 and spring 28 has its opposite ends abutting the cassette upper half case 2 and the guard panel 8 respectively, so as to bias the guard panel 8 into downwardly projecting right angle position with respect to the cassette upper half case 2 to partially close off opening 10 at the front of the cassette.

After the upper half case 2 is positioned on the lower half case 3, screws or the like (not shown) may be employed in connecting the upper and lower half cases 2 and 3 together to complete the assembly of the magnetic tape cassette 1.

During the time that the magnetic tape cassette 1, thus assembled, is not in use, the cassette front opening 10 is closed off by the guard panel 8 and the slide guard 20, and the slide guard 20 is in a position such that the holes 23 therein are misaligned with the shaft inserting holes 14 of the cassette lower half case 3. Further, the annular collars 4a of the hubs 4 are engaged by the protrusion 7 of the hub locking member 6 to prevent rotation of the hubs 4.

The upper and lower half cases 2 and 3, the guard panel 8, and the locking member 6 may be made of plastic resin such as polyacetal resin, ABS resin or PS resin similar to convention magnetic tape cassettes. The slide guard 20 may also be made of the same plastic resin, or alternatively, may be made of metal such as stainless steel. However, it is preferable that the slide guard 20 is made of a plastic resin which is high in wear resistance with respect to the material forming the upper and lower half cases 2 and 3. Wherein the cassette body is made of plastic resin, a metal slide guard may scrape the cassette body while being slid on that body repeatedly.

The magnetic tape T may be a ferromagnetic iron oxide tape or a chromium dioxide tape; however, it should be a metal tape or vacuum deposition tape suitable for high density recording and reproducing.

As may be appreciated from the above, since the tapered ramp 36 is formed on the rear edge 20a of the slide guard 20 which slide guard is slidably attached to the lower half case 3, this eliminates the difficulty of the prior designs, where an assembling the cassette the end part 34 of the locking member 33 is caught by the rear edge 20a. The slide guard may thus be readily mounted to the lower half case for sliding to and fro. This effect is significant especially with compact magnetic tape cassettes to which the invention has applicability. Therefore, the magnetic tape cassette provided in accordance with this invention may be readily assembly, for instance by mechanical means.

While the invention has been described in detail with respect to a specific embodiment thereof, it will be apparent to one skilled in the art that modifications and changes can be made therein without the parting from the spirit and the scope thereof.

What is claimed is:

1. A magnetic tape cassette comprising; upper and lower half cases joined together and defining a chamber therebetween, a pair of hubs on which a magnetic tape is wound positioned within said chamber, a hub locking member mounted to one of said upper and lower half cases, within said chamber, and engaging said hubs for locking said hubs against rotation, said upper and lower half cases having a front end, an opening within said front end through which said magnetic tape can be pulled forwardly of said cassette, a guard panel rotatably mounted to said cassette at said front end to open and close said opening, a generally U-shaped slide guard slidably mounted on the bottom of the lower half case, said lower half case including a bottom wall, a cantilever type locking member integral with said lower half case bottom wall and having an end part projecting downwardly from the bottom of the lower half case, said slide guard having aligned locking holes for selectively receiving said end part of said locking member so that the position of the slide guard is maintained selectively by engagement of the end part of the locking member with a given one of said locking holes, the improvement comprising a tapered ramp formed on the edge of the slide guard remote from the front opening of said cassette, said tapered ramp being aligned with said locking holes and said ramp extending rearwardly of the cassette and inclined downwardly so that when the slide guard is attached to the lower half case, the end part of the locking chamber slides on said tapered ramp for cammed projection into the bottom of the lower half case so as to easily ride on the upper surface of the bottom wall of the slide guard until reaching a given one of said locking holes.

* * * * *